(12) United States Patent  
Jeanson et al.

(10) Patent No.: US 8,340,152 B2
(45) Date of Patent: Dec. 25, 2012

(54) SPREAD SPECTRUM CLOCKING WITH TRANSMITTED MODULATION

(75) Inventors: Mark James Jeanson, Rochester, MN (US); Jordan Ross Keuseman, Rochester, MN (US); George Russell Zettles, IV, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/183,854

(22) Filed: Jul. 31, 2008

(65) Prior Publication Data

US 2010/0027585 A1    Feb. 4, 2010

(51) Int. Cl.
*H04B 1/00*    (2006.01)

(52) U.S. Cl. ........ 375/130; 375/296; 375/327; 375/371; 375/376; 375/377; 327/144; 327/156; 327/291

(58) Field of Classification Search .................. 375/130, 375/139, 145, 149, 260, 327, 367, 371, 373–374, 375/376–377; 327/141, 144, 156, 158, 291; 370/515–516; 708/250–252, 255

See application file for complete search history.

(56) References Cited

U.S. PATENT DOCUMENTS

| | | | | |
|---|---|---|---|---|
| 6,167,103 A * | 12/2000 | Hardin | ........................... | 375/376 |
| 6,294,936 B1 * | 9/2001 | Clementi | ...................... | 327/156 |
| 6,400,821 B1 * | 6/2002 | Burgan et al. | ................. | 379/361 |
| 6,442,188 B1 * | 8/2002 | Zhang et al. | .................. | 375/130 |
| 7,050,478 B1 * | 5/2006 | Weekly | ......................... | 375/130 |
| 7,809,056 B2 * | 10/2010 | Chang | ........................... | 375/238 |

\* cited by examiner

*Primary Examiner* — Sam K Ahn
*Assistant Examiner* — Sophia Vlahos
(74) *Attorney, Agent, or Firm* — Robert R. Williams

(57) ABSTRACT

An electronic system having a spread spectrum clock is disclosed. A spread spectrum clock source creates and transmits both a spread spectrum clock signal and a modulation signal. A spread spectrum clock generator uses a modulation waveform on the modulation signal to frequency modulate a reference oscillator frequency. A logic unit comprises a Phase Locked Loop that receives the spread spectrum clock signal and the modulation signal and generates a logic unit clock signal.

6 Claims, 5 Drawing Sheets

SPREAD SPECTRUM CLOCKING WITH TRANSMITTED MODULATION

FIELD OF THE INVENTION

This invention relates generally to spread spectrum clocking of logic units.

SUMMARY OF EMBODIMENTS OF THE INVENTION

Many countries have standards established by regulatory bodies of the countries that define limits of energy emitted at particular frequencies. If an electronic system emits more energy at one or more of the particular frequencies than the standards permit, the electronic systems can not be sold in those countries.

Many modern electronic systems, such as computers, personal digital assistants (PDA), and the like, use spread spectrum clocking to reduce energy of radiated electromagnetic interference (EMI) at a particular frequency. Spread spectrum clocking provides for frequency modulation of a clock such that, although total energy emitted may be as much as clocking without spread spectrum, power at any particular frequency does not last long enough to exceed energy limits at that particular frequency.

For example, an exemplary spread spectrum clock signal may have a frequency that varies from 0.98 MHz (megahertz) to 1.02 MHz based on a modulation signal that carries a modulation waveform. The modulation waveform may be a sawtooth waveform or other waveform suitable to modulate the spread spectrum clock.

A conventional logic unit that receives the spread spectrum clock signal relies on a phase locked loop (PLL) to follow the frequency variations of the spread spectrum clock signal. A phase detector in the PLL constantly provides a signal to a voltage controlled oscillator (VCO) in the PLL to speed up or slow down the frequency of the VCO that produces a logic unit clock as the spread spectrum clock signal speeds up or slows down as modulated by the modulation waveform. The output of the phase detector in the PLL is typically filtered such that noise on the spread spectrum clock signal or in the PLL does not cause the PLL to become unsynchronized with the spread spectrum clock signal. The phase detector and associated filter cause delays in tracking the spread spectrum clock signal that result in wander and jitter in frequency of the output of the VCO in the PLL of the conventional logic unit.

Embodiments of the present invention provide for reduced jitter and wander in a logic unit clock frequency by transmitting a modulation signal along with a spread spectrum clock signal. A PLL in a logic unit that receives the spread spectrum clock signal and associated modulation signal uses the modulation signal to guide a VCO in the PLL by adding a filtered output of a phase detector in the PLL with the modulation signal and inputting the output of the addition to the VCO to produce a logic unit clock having less jitter and wander.

In an alternative embodiment of the invention, the logic unit clock is desired to have a frequency that varies less than proportionately to the frequency variation seen on the spread spectrum clock signal. The logic unit may desire to receive a spread spectrum clock signal but have a constant frequency logic unit clock derived from the spread spectrum clock signal and modulation signal. In the alternative embodiment, the modulation signal is subtracted from the filtered output of the phase detector such that the VCO frequency varies less than proportionately to the frequency variations of the spread spectrum clock signal. If the respective weights of the modulation signal and the phase detector output are properly selected, the VCO frequency is constant.

DETAILED DESCRIPTION OF THE EMBODIMENTS

In the following detailed description of embodiments of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Embodiments of the invention provide for a spread spectrum clock source that transmits a spread spectrum clock signal having a frequency modulated by a modulation signal. The spread spectrum clock source transmits both the spread spectrum clock signal and the modulation signal. One or more logic units (chips are used as concrete examples of logic units for explanatory purposes) receive both the spread spectrum clock signal and the modulation signal. The logic units comprise a PLL that uses the spread spectrum clock signal and the modulation signal to produce a clock used in the logic units.

Figure 1:
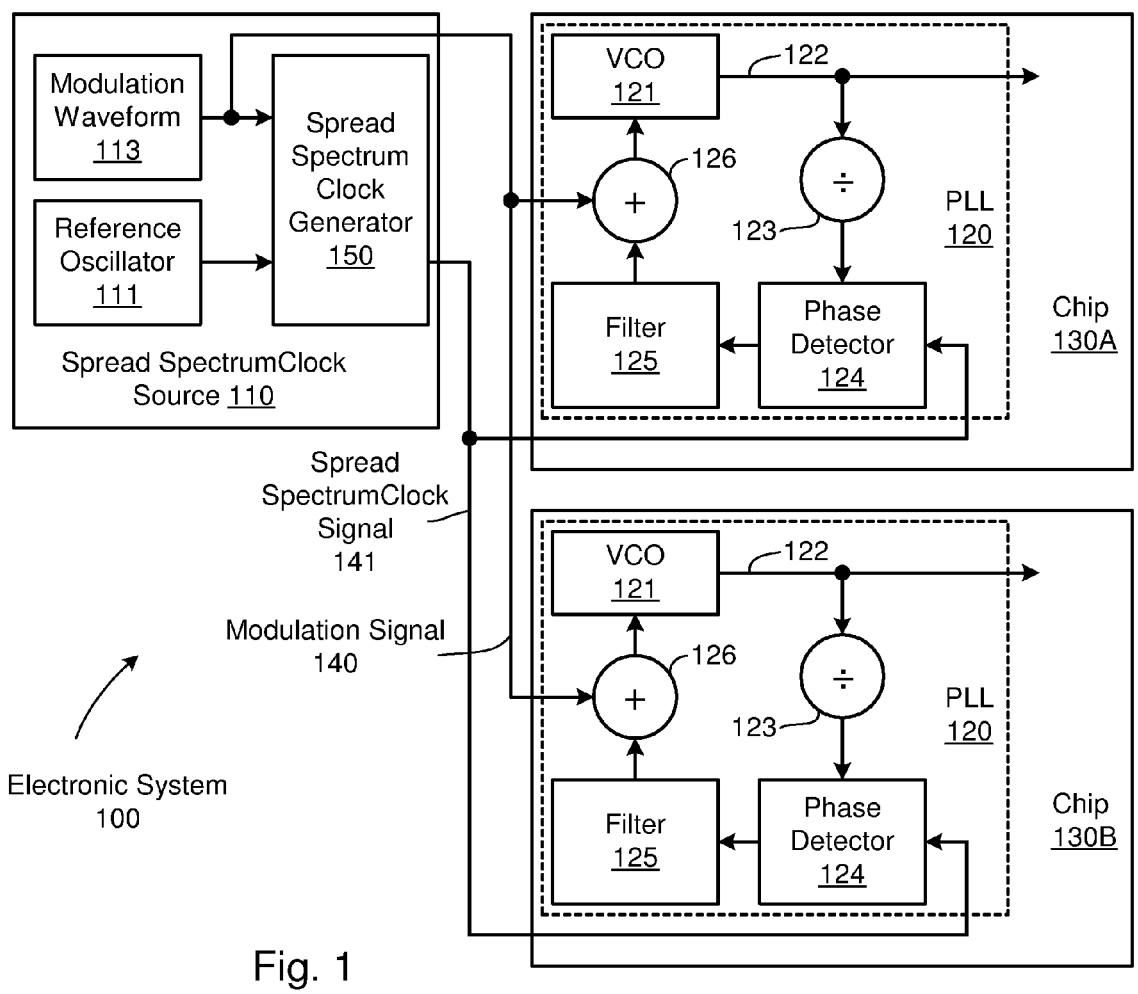
FIG. 1 is a block diagram of an electronic system having a spread spectrum clocking.

With reference now to FIG. 1, an electronic system 100 is shown. Electronic system 100 comprises a spread spectrum clock source 110 that further comprises a modulation waveform 113, a reference oscillator 111, and a spread spectrum clock generator 150. Spread spectrum clock source 110 outputs a spread spectrum clock signal 141 and a modulation signal 140. For simplicity, one spread spectrum clock signal 141 and one modulation signal 140 is shown. However, for signal integrity reasons, a separate spread spectrum clock signal 141 is typically transmitted to each chip 130 from spread spectrum clock source 110. Multiple instances of modulation signal 140 may also be sent from spread spectrum clock source 110.

One or more chips 130 receive both spread spectrum clock signal 141 and modulation signal 140. In electronic system 100, two chips 130, referenced as chip 130A and chip 130B are shown.

"Chips", such as a processor chip, or an application specific integrated circuit (ASIC), are used for explanatory purposes. Any logic unit, such as a printed circuit board (PWB) having a number of chips, or even a rack of computer processors is contemplated.

Each chip 130 comprises a phase locked loop PLL 120 that receives spread spectrum clock signal 141 and modulation signal 140. As shown in FIG. 1, a VCO 121 receives a voltage that is a sum of modulation signal 140 and an output from a filter 125. Either or both inputs to a summing circuit 126 may be scaled or weighted to provide a suitable response from PLL 120 to modulation signal 140 and spread spectrum clock signal 141. VCO 121 produces a logic unit clock signal 122 that is used as a clock on chip 130 (e.g., chip 130A, chip 130B). Clock signal 122 would typically be buffered and may be replicated before distribution on chip 130. Clock signal 122 is typically divided in frequency by frequency divider 123 and fed into a phase detector 124. Phase detector 124 also receives clock signal 141. Phase detector 124 provides an input to filter 125 having a value depending on whether logic unit clock signal 122 (as divided by frequency divider 123) is ahead of spread spectrum clock signal 141, behind spread spectrum clock signal 141, or is the same as spread spectrum clock 141 in phase. Typically, phase detector 124 comprises a charge pump that adds or subtracts charge from a capacitor (e.g., filter 125).

Figure 2A:
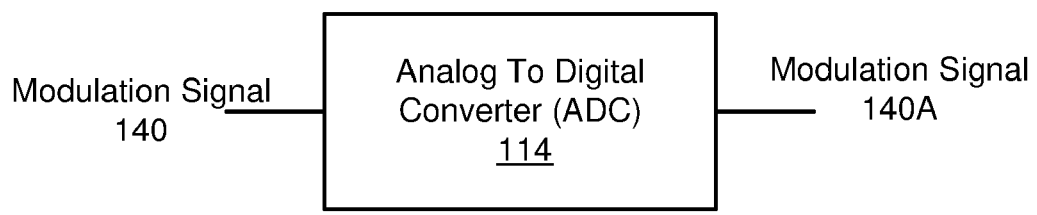
FIGS. 2A and 2B are block diagrams showing a modulation signal and blocks that convert an analog version of the modulation signal into a digital version of the modulation signal, as well as conversion of a digital version of the modulation signal into an analog version of the modulation signal.
Figure 2B:
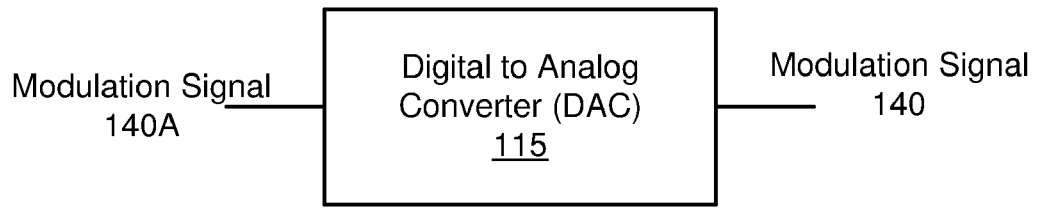

Modulation signal 140 may be, in embodiments, an analog signal or a digitally encoded signal. For present purposes, both are considered equivalent, and are readily converted from one to the other and back, as shown in FIGS. 2A and 2B. In FIG. 2A, an analog version of the modulation signal, modulation signal 140 is input to an analog to digital converter (ADC) 114 which outputs a digitally encoded modulation signal 140A on a plurality of signal conductors. In FIG. 2B, a digitally encoded modulation signal 140A is input to digital to analog converter (DAC) 115 which outputs an analog version, modulation signal 140. Whereas, for explanation in this paragraph, reference numerals 140 and 140A are used to describe analog and digital versions of the modulation signal, in general, reference numeral 140 refers to a modulation signal whether the modulation signal is analog or digital.

Figure 3:
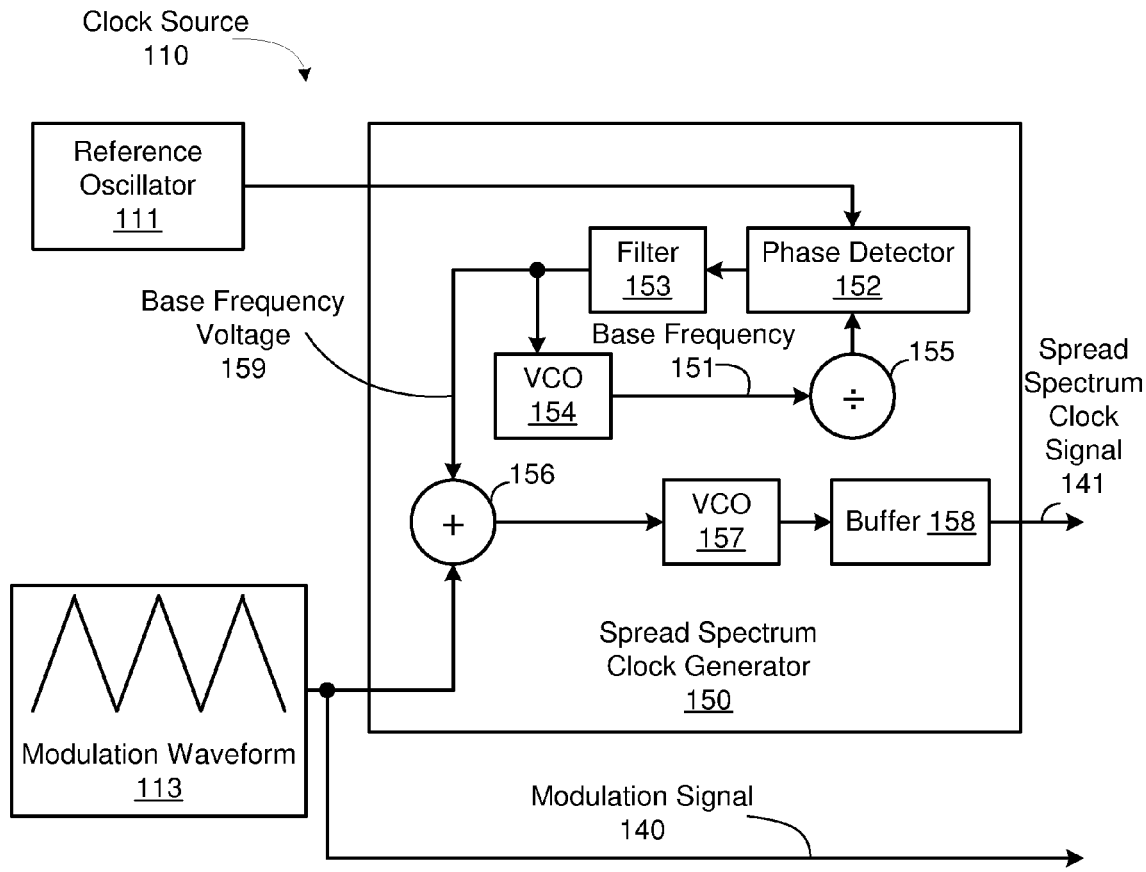
FIG. 3 is a block diagram of a spread spectrum clock generator that receives a reference oscillator output and a modulation signal and transmits a spread spectrum clock signal and the modulation signal.

FIG. 3 shows spread spectrum clock source 110 in more detail. Reference oscillator 111 is as shown in FIG. 1 and is typically a crystal oscillator having a fixed frequency. Modulation waveform 113 is shown having a sawtooth modulation waveform for illustration, but other waveforms are also practiced in the art. Spread spectrum clock generator 150 comprises a PLL that includes a phase detector 152, a filter 153, and a first VCO 154. The PLL locks a base frequency 151 to a desired multiple of reference oscillator 111. First VCO 154 is coupled to a frequency divider 155 which in turn drives a frequency divided version of the output of first VCO 154 into phase detector 152. Phase detector 152 produces a signal responsive to a phase relationship between the output of reference oscillator 111 and the divided version of first VCO 154. Phase detector 152 typically comprises a charge pump. The signal from phase detector 152 is filtered by filter 153 (typically a capacitor) to produce base frequency voltage 159. Base frequency voltage 159, once the PLL is locked, does not vary significantly.

Modulation is performed by summing (perhaps a weighted sum) by summing circuit 156, which adds base frequency voltage 159 and modulation signal 140 and outputs a modulated voltage to a second VCO 157. An output of second VCO 157 is driven to buffer 158 which produces spread spectrum clock signal 141.

Figure 4:
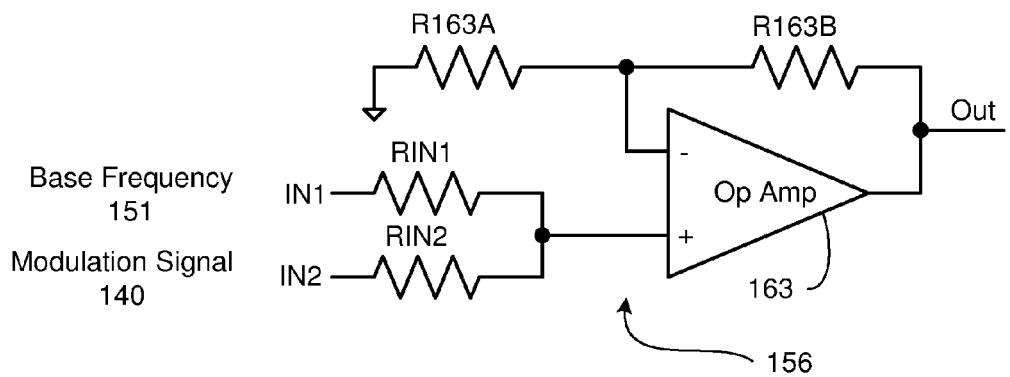
FIG. 4 is a schematic of an analog signal adder used in the spread spectrum clock generator.

FIG. 4 illustrates a schematic of a circuit suitable for summing circuit 156. Input IN1 (coupled to base frequency voltage 159 in FIG. 3) is coupled to a first end of resistor RIN1; Input IN2 (coupled to modulation signal 140 in FIG. 3) is coupled to a first end of resistor RIN2. Second ends of resistors RIN1 and RIN2 are coupled to a positive phase input of operational amplifier 163. Operational amplifier 163 drives an output (coupled to second VCO 157 in FIG. 3), and is further coupled through a resistor network comprising resistors R163A and R163B to a negative phase input of operational amplifier 163.

As noted earlier, if more than one chip 130 (e.g., chips 130A and 130B in FIG. 1) exists in electronic system 100, multiple instances of buffer 158 and multiple instances of clock signal 141 are typically used for signal integrity reasons. Furthermore, multiple instances of modulation signal 140 may be transmitted. If an analog version of modulation signal 140 is to be replicated, operational amplifiers may be used to provide replicas. If a digital version of modulation signal is to be replicated, digital buffers may be used to provide replicas.

Figure 5A:
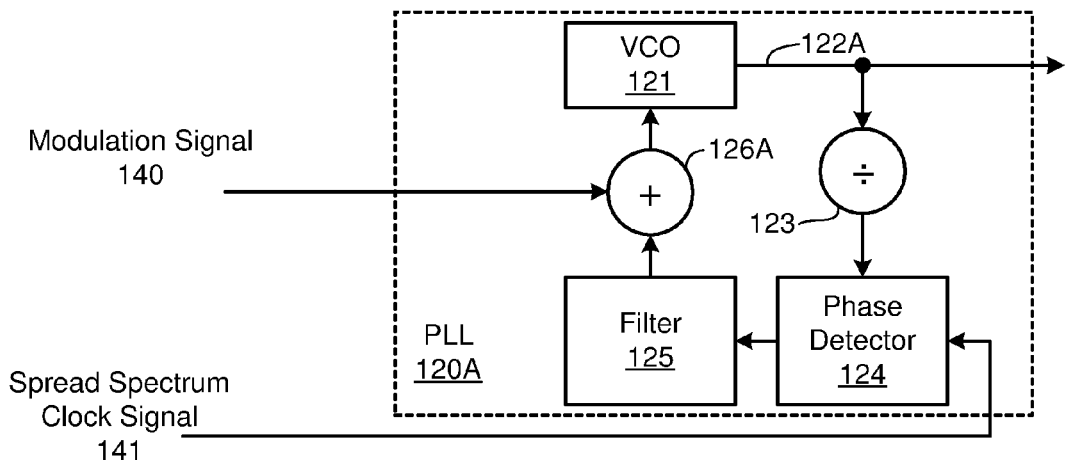
FIG. 5A is a block diagram of a PLL circuit on a chip that receives the modulation signal and the spread spectrum clock signal.
Figure 5B:
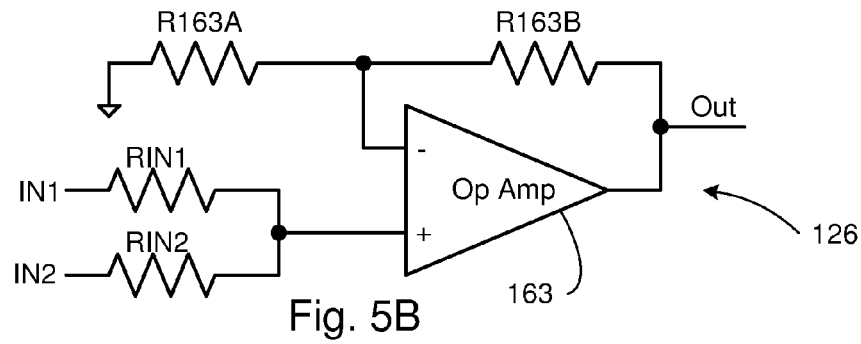
FIG. 5B is a schematic of an analog signal adder suitable for use in the block diagram of FIG. 5A.
Figure 5C:
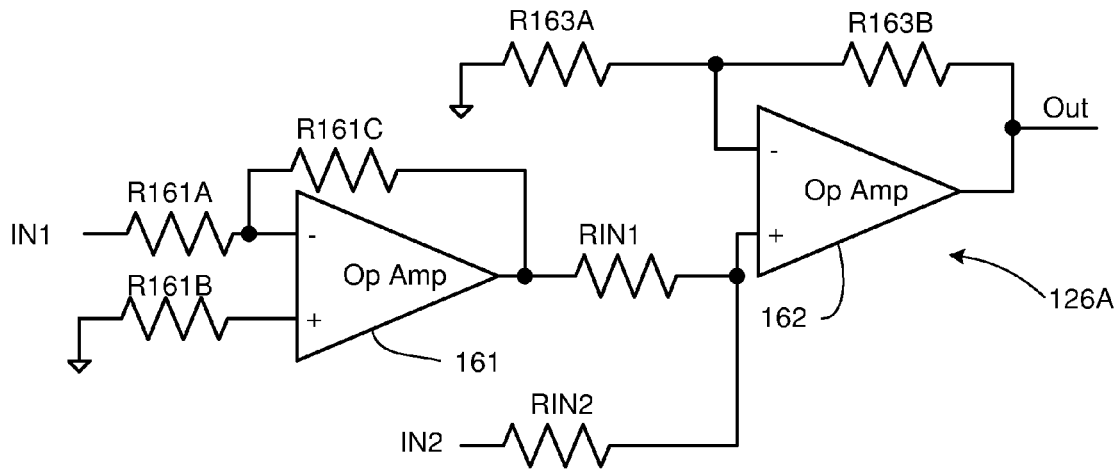
FIG. 5C is a schematic of an analog signal adder configured to subtract a first signal from a second signal, suitable for use in the block diagram of FIG. 5A.

FIGS. 5A, 5B, and 5C depict various implementations of PLL 120 (FIG. 1) and variant PLL 120 (denoted as PLL 120A in FIG. 5A).

PLL 120 of FIG. 1 comprises an adder circuit 126 that adds modulation signal 140 to an output of a filter 125. A suitable adding circuit 126 is shown in FIG. 5B, which operates in a similar manner to adding circuit 156 described earlier. Components in adder circuit 126 function as corresponding components in adding circuit 156 and therefore have the same reference numerals. Weighting of input IN1 and input IN2 is determined by the values of RIN1 and RIN2. For example, if RIN1 has a low value relative to RIN2, IN1 will have a relatively higher weighting in the sum of IN1+IN2. Continuing the example, when IN1 is connected to modulation signal 140 (FIG. 1), and IN2 is connected to filter 125 (FIG. 1) modulation signal 140 will influence the frequency output by VCO 121 (FIG. 1), increasing frequency of VCO 121 as modulation signal 140 increases, and decreasing frequency of VCO 121 as modulation signal 140 decreases.

PLL 120 of FIG. 1 uses modulation signal 140 to reduce jitter and frequency wander in clock signal 122 by adding modulation signal 140 to the output of filter 125.

In a conventional PLL that receives a spread spectrum clock signal, and does not include an input of modulation signal 140, the conventional PLL must constantly be correcting for changes in frequency in the spread spectrum clock signal. A Phase detector in the conventional PLL is constantly reacting to small phase differences between a VCO and the spread spectrum clock signal. Undesirable jitter in a logic unit chip clock signal is introduced as the conventional PLL "chases after" changes in frequency of the spread spectrum clock signal. A loop response in the conventional PLL has to be relatively slow in order that the conventional PLL is not seriously affected by noise on the spread spectrum clock signal or on-chip noise. "Chasing after" frequency changes on the spread spectrum clock signal introduces jitter and frequency wander in a conventional PLL that receives a spread spectrum clock signal.

In PLL 120 of FIG. 1, modulation signal 140 is used to guide PLL 120 to provide a logic unit clock signal 122 with reduced jitter and frequency wander compared to a conventional PLL.

In some applications, spread spectrum clock signals are used to distribute clocks, but a logic unit clock on a chip is desired to have little or no frequency variation. For example, a particular chip 130 may have very little timing slack and can not tolerate significant frequency variation, even though significant frequency variation exists on the spread spectrum clock signal that is input to the particular chip. For such applications, a variant of PLL 120, PLL 120A, shown in FIG. 5A and FIG. 5C is used. PLL 120A works in a manner similar to PLL 120 (FIG. 1), and uses modulation signal 140 to influence PLL 120A. However, in PLL 120A, a difference between modulation signal 140 and an output of filter 125 is driven to VCO 121, thereby producing a clock signal 122A that has less frequency variation than is found (including frequency scaling provided by frequency divider 123) in spread spectrum clock signal 141.

Adding circuit 126A of FIGS. 5A and 5C comprises operational amplifier 162, and resistors R163A, R163B, RIN1 and RIN2 as in adding circuit 126 of FIG. 5B. Adding circuit 126A, however, further includes an analog inverting circuit that provides a negative version of input IN1 to a first end of resistor RIN1 (FIG. 5C). Operational amplifier 161 receives IN1 at an inverting input via a resistor network comprising R161A and R161C as shown. A positive input of operational amplifier 161 is coupled to ground through R161B. As before, relative values of resistances are used to provide desired weighting of IN1 and IN2.

For example, suppose that clock signal 122A (FIG. 5A) is desired to have a constant frequency, whereas spread spectrum clock signal 141 changes frequency based on modulation signal 140. Spread spectrum clock signal 141 enters phase detector 124 which compares phase of clock signal 141 with (a frequency divided version of) clock signal 122A. Phase detector 124 drives filter 125 according to a phase difference detected. As spread spectrum clock signal 141 increases and decreases in frequency while clock signal 122A remains at a fixed frequency, filter 125 will input to adder circuit 126A a signal that would, by itself, cause VCO 121 to correct the difference in phase. However, adder circuit 126A, shown in FIG. 5C, subtracts modulation signal 140 from the output of filter 125. Suitable resistance values selected for adder circuit 126A, such that voltage changes at a first end of RIN1 are equal but opposite voltage changes at a first end of RIN2 (and RIN1=RIN2), adder circuit 126A will provide a constant voltage to VCO 121 and VCO 121 will therefore provide a constant frequency on clock signal 122A. If voltage changes at the first end of RIN1 are less than voltage changes at the first end of RIN2, frequency changes on logic unit clock signal 122A will vary, but less than proportionally, to frequency changes on spread spectrum clock signal 141. Alternatively, a less than proportional frequency change on logic unit clock signal 122A can be made by suitably ratioing RIN1 and RIN2.

As explained with reference to FIGS. 2A and 2B, if modulation signal 140 is transmitted as a digital signal, a DAC is used to provide an analog version of modulation signal 140.

Figure 6:
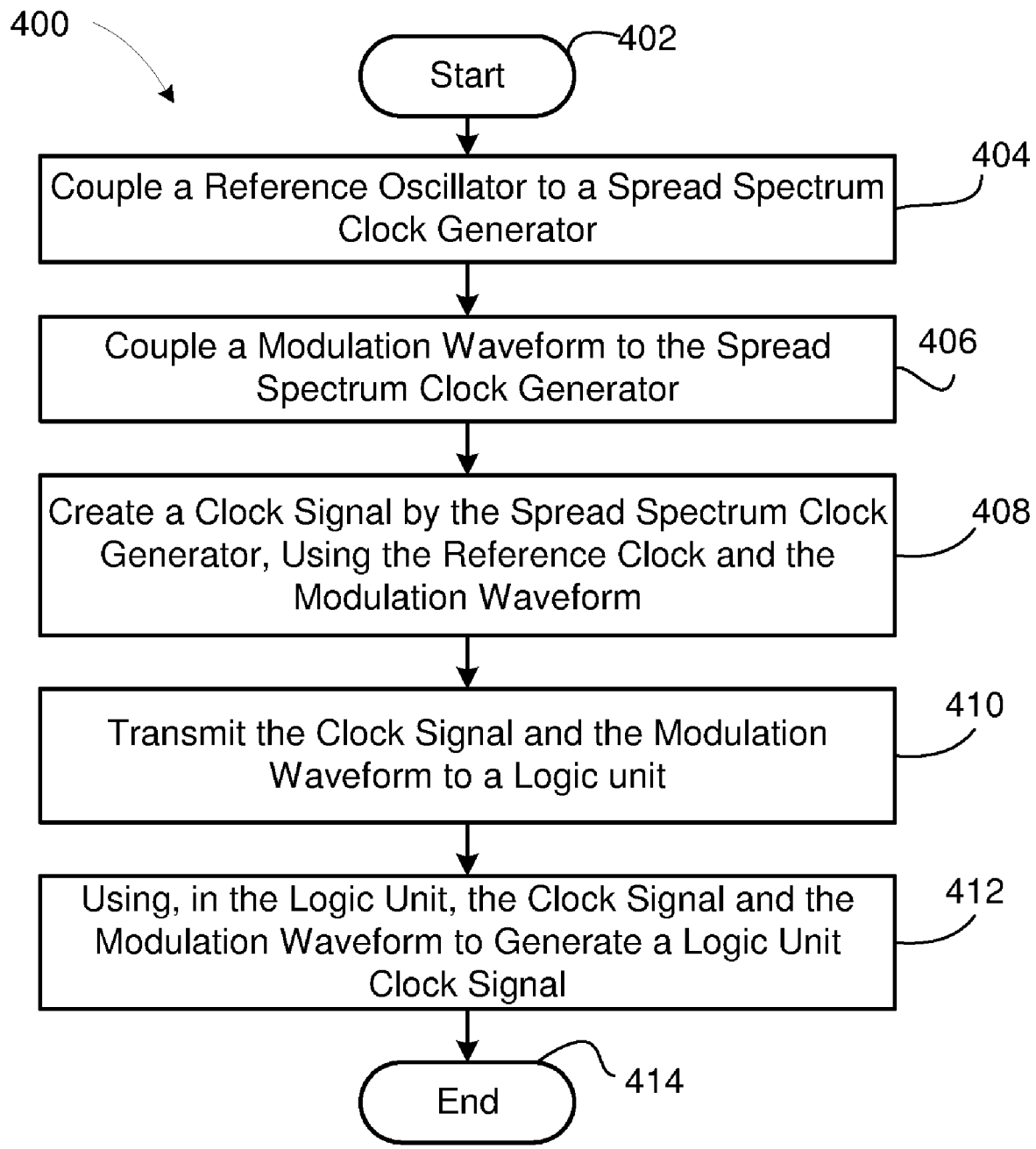
FIG. 6 is a flow chart of a method embodiment of the invention.

FIG. 6 is a flow chart of a method embodiment 400 of the invention. Method 400 begins at block 402.

In block 404, a reference oscillator is coupled to a spread spectrum clock generator. The reference oscillator may be, for example, a crystal oscillator having a fixed frequency.

In block 406, a modulation waveform driven onto a modulation signal is coupled to the spread spectrum clock generator. The modulation waveform may be a sawtooth waveform or any other waveform suitable to modulate the fixed frequency of the reference clock. Typically, maximum frequency components of the modulation waveform are an order of magnitude or more less than maximum frequency components of the reference clock.

In block 408, a spread spectrum clock signal is created by the spread spectrum clock generator, using the reference oscillator and the modulation waveform input to the spread spectrum clock signal on the modulation signal. The spread spectrum clock signal frequency at any point in time depends on the frequency of the reference clock and the value of the modulation waveform. For example, suppose that an average frequency of the spread spectrum clock signal is one megahertz (MHz). The spread spectrum clock signal may vary from 0.98 MHz to 1.02 MHz depending on the value of the modulation signal.

In block 410, the spread spectrum clock signal is transmitted and the modulation waveform is transmitted on a modulation signal. The modulation signal may be transmitted either as an analog signal or a digital signal (e.g., an eight bit digital signal). Both the spread spectrum clock signal and the modulation signal are transmitted to a logic unit. A logic unit may be a semiconductor chip (e.g., a processor chip or an ASIC chip). The logic unit may be a printed wiring board having a number of chips mounted thereon, one or more of those chips receiving the spread spectrum clock signal and the modulation signal. The logic unit may be a rack of computers in a large supercomputer. For signal integrity reasons, typically a separate copy of the spread spectrum clock signal is sent to each logic unit. Likewise, in embodiments, a separate copy of the modulation signal may also be sent to each logic unit.

In block 412, the logic unit uses the spread spectrum clock signal and the modulation signal to generate a logic unit clock signal in the logic unit. In an embodiment, the modulation signal is used to guide a PLL as to frequency changes that are being made on the spread spectrum clock signal. This guidance reduces jitter and frequency wander on the logic unit clock signal. Without this guidance, the PLL will always be producing a frequency on the logic unit clock signal that lags the frequency received on the spread spectrum clock signal. With this guidance, the PLL can minimize or eliminate lag in frequency between the logic unit clock signal and the spread spectrum clock signal. In another embodiment, a fixed, or relatively fixed, frequency is desired on the logic unit clock signal. For example, a particular logic unit may have very tight timing requirement and can not tolerate the variation in frequency of the spread spectrum clock signal. In this embodiment, the modulation signal is used to guide the PLL on the logic unit to keep the logic unit clock signal at a fixed or relatively fixed frequency, essentially forcing the PLL on the logic unit to ignore frequency variations of the spread spectrum clock signal. For example, if a two percent frequency variation occurs on the spread spectrum clock signal, frequency variation can be limited to one percent on the logic unit clock signal.

Block 414 ends method 400.

What is claimed is:

1. An apparatus comprising:
   a spread spectrum clock source configured to output a spread spectrum clock signal modulated by a modulation signal and further output the modulation signal; and
   a logic unit comprising a phase locked loop configured to receive the spread spectrum clock signal and the modulation signal and further configured to generate a logic unit clock signal using the spread spectrum clock signal and the modulation signal to control a frequency of the logic unit clock signal;
   the phase locked loop comprises:
      a voltage controlled oscillator that drives the logic unit clock signal;

a phase detector configured to output a signal responsive to a phase difference between the logic unit clock signal and the spread spectrum clock signal; and an adder circuit configured to use the modulation signal and the output of the phase detector to control the frequency of the logic unit clock signal; and wherein the adder circuit combines the modulation signal with the output of the phase detector to control the frequency of the logic unit clock signal to be less than proportional to a frequency of the spread spectrum clock signal.

2. The apparatus of claim 1, the spread spectrum clock source further comprising:

a modulation waveform source generating the modulation signal;

a reference oscillator; and a spread spectrum clock generator that creates the spread spectrum clock signal using the modulation signal and the reference oscillator.

3. The apparatus of claim 1 further comprising a frequency divider coupled to the logic unit clock signal that produces a frequency divided logic unit clock signal, the frequency divided logic unit clock signal driven to the phase detector.

4. The apparatus of claim 1, wherein the frequency of the logic unit clock signal is constant.

5. The apparatus of claim 1, wherein the signal output by the phase detector is responsive to the phase difference is filtered by a filter.

6. The apparatus of claim 5, wherein the filter comprises a capacitor.

* * * * *